United States Patent
Wu et al.

(10) Patent No.: US 8,280,637 B2
(45) Date of Patent: Oct. 2, 2012

(54) DEVICE FOR MEASURING A FLUID FLOW VELOCITY AND DIRECTION

(75) Inventors: Xu Wu, Paris (FR); Frederique Kalb, Sao Paulo (BR); Christian Chouzenoux, St. Cloud (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 599 days.

(21) Appl. No.: 11/993,167

(22) PCT Filed: Jun. 1, 2006

(86) PCT No.: PCT/EP2006/005386
§ 371 (c)(1),
(2), (4) Date: Apr. 5, 2010

(87) PCT Pub. No.: WO2007/000224
PCT Pub. Date: Jan. 4, 2007

(65) Prior Publication Data
US 2010/0185394 A1 Jul. 22, 2010

(30) Foreign Application Priority Data

Jun. 29, 2005 (EP) .................................... 05291509

(51) Int. Cl.
*G01V 1/40* (2006.01)
*G01P 3/36* (2006.01)

(52) U.S. Cl. ............................................. 702/8; 357/27

(58) Field of Classification Search .............. 702/8, 1–2, 702/6, 9, 11–14, 18, 33, 40–41, 45, 49–50, 702/81, 84, 127, 142, 145, 150–153, 156–157, 702/159, 182–183, 188–189; 73/1.16, 1.37, 73/1.41, 152.18–152.19, 152.21, 152.29, 73/152.34, 152.46, 170.01, 170.11, 488, 73/494, 504.01, 504.11, 521, 861, 861.32–861.33, 73/861.352, 861.77, 861.79, 861.86; 356/4.01, 4.09, 4.1, 5.02–5.03, 5.09, 5.11, 27–28, 28.5, 138, 139.03, 139.09, 152.1, 304, 343, 459–460, 462, 477–478, 484, 507–508, 912; 367/14, 25, 28–30, 84

See application file for complete search history.

(56) References Cited

U.S. PATENT DOCUMENTS 3,771,362 A 11/1973 Roberts
(Continued)

FOREIGN PATENT DOCUMENTS

EP 1739396 B1 * 8/2010
(Continued)

OTHER PUBLICATIONS

Crowder et al., Spinner Flowmeter Logging a Combination of Borehole Geophysics and Hydraulics, Jul. 18, 2002, Prepared for Arizona Hydrological Society's Well Design and Installation Workshop, Phoenix, Arizona, 38 pp.*

*Primary Examiner* — Toan M Le
(74) *Attorney, Agent, or Firm* — Stephanie Chi

(57) ABSTRACT

A device and method for measuring a fluid flow velocity and direction. The device includes: a modulator for modulating an incident signal from a fiber optical arrangement. The modulator includes an encoder resulting in a modulated signal having at least a first portion, a second portion and a third portion for each complete rotation of the encoder. The device further includes a processor for determining the fluid flow velocity and direction based on at least the first portion, the second portion and the third portion of the modulated signal. The method includes modulating an incident beam to have a first portion, a second portion and a third portion for each rotation of an encoder and processing the modulated signal to determine a fluid flow velocity and direction.

12 Claims, 11 Drawing Sheets

U.S. PATENT DOCUMENTS 4,345,480 A * 8/1982 Basham et al. ............ 73/861.77
6,880,646 B2 * 4/2005 Batarseh ..................... 175/15
7,703,514 B2 * 4/2010 Chee et al. ............... 166/250.01
7,900,699 B2   3/2011 Ramos et al.

FOREIGN PATENT DOCUMENTS

| JP | 08165879 | 10/1996 |
| WO | 2004010089 | 1/2004 |
| WO | 2004020789 | 3/2004 |

* cited by examiner

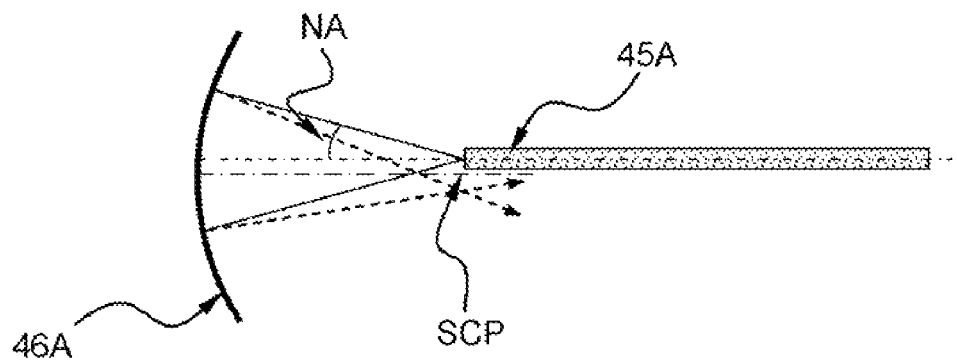
FIG. 3.A
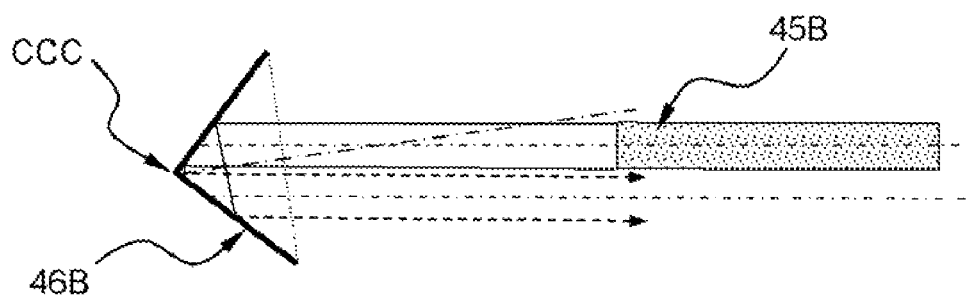
FIG. 3.B
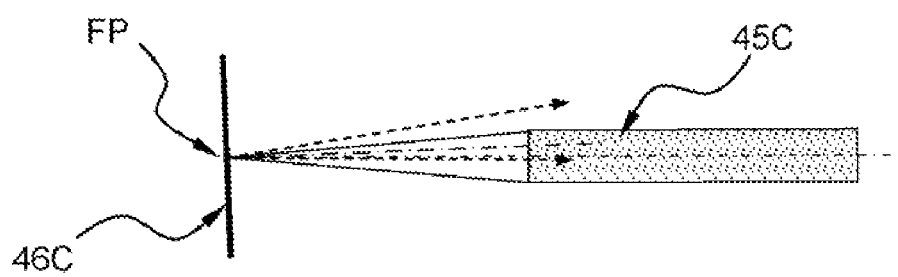
FIG. 3.C

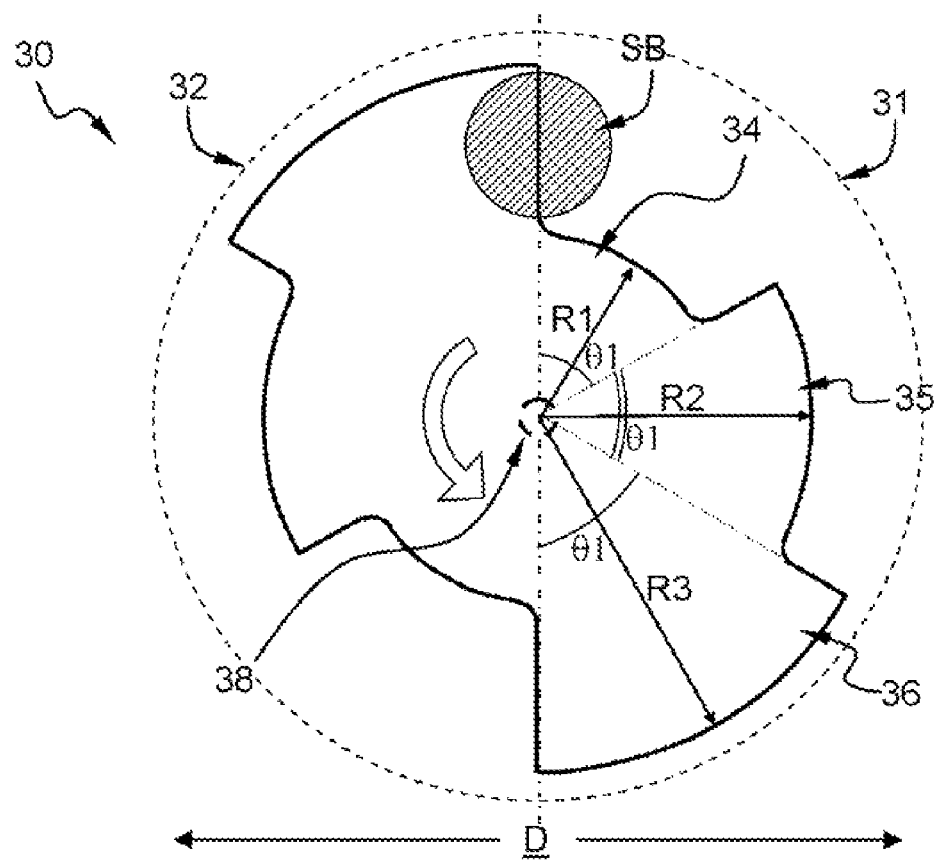
FIG. 4.A
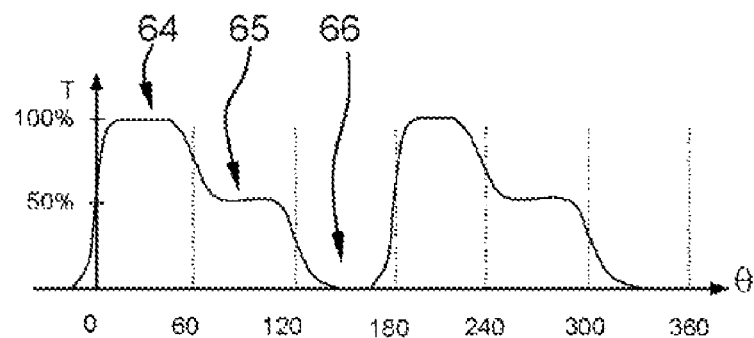
FIG. 4.B

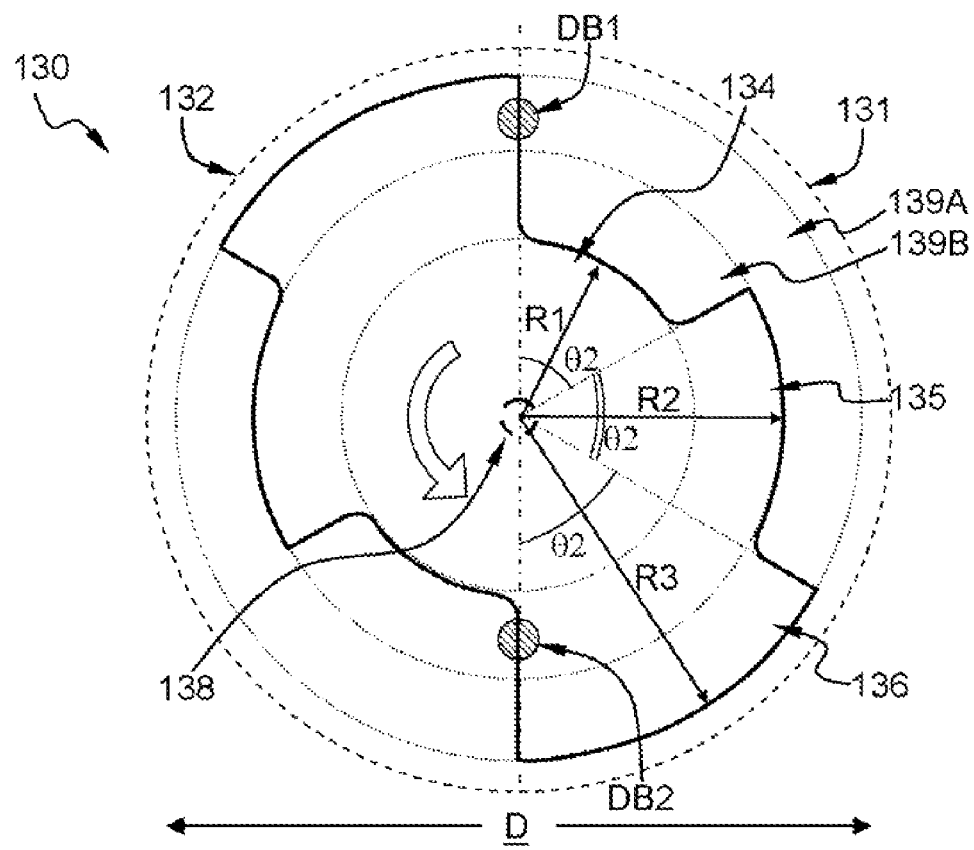
FIG. 5.A
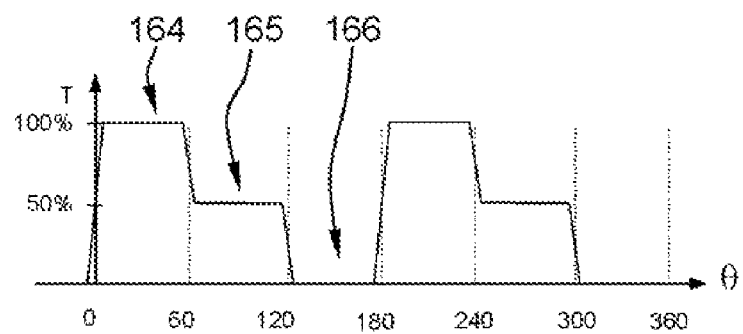
FIG. 5.B

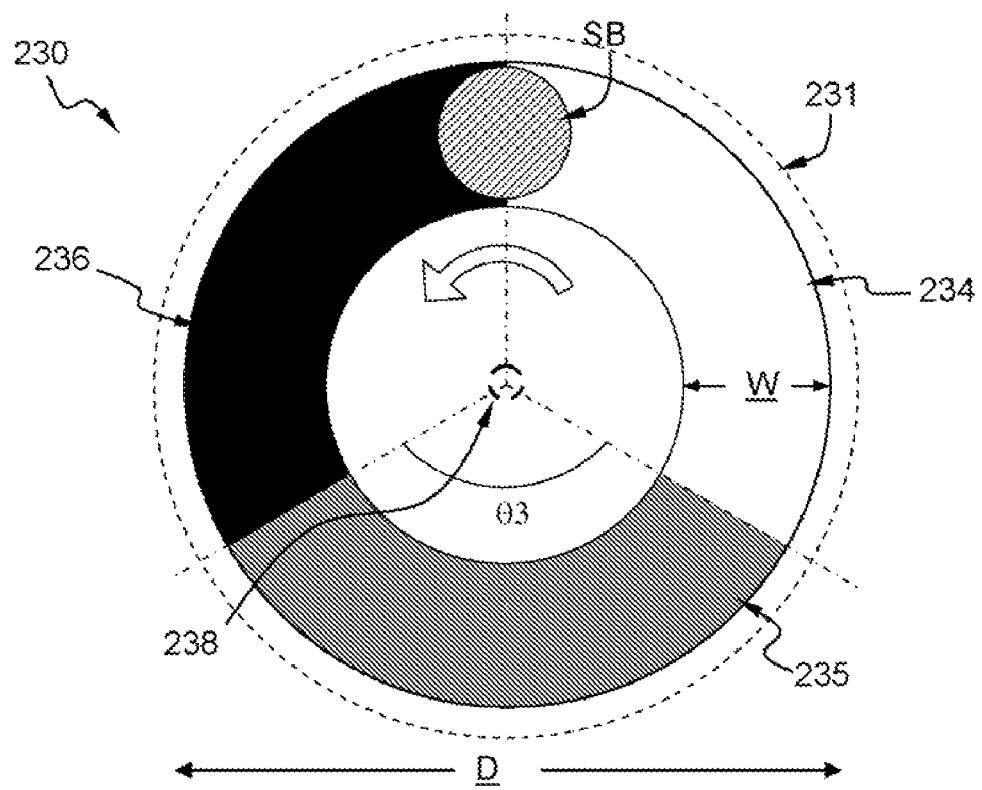
FIG. 6.A
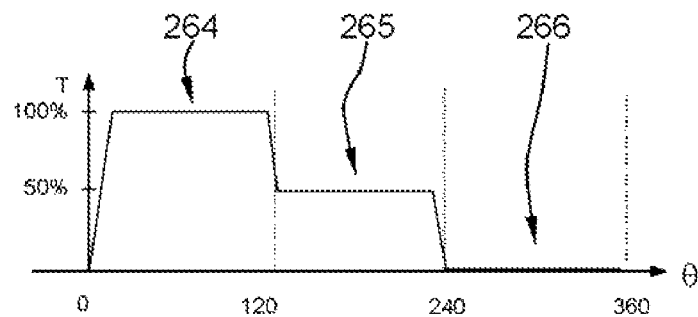
FIG. 6.B

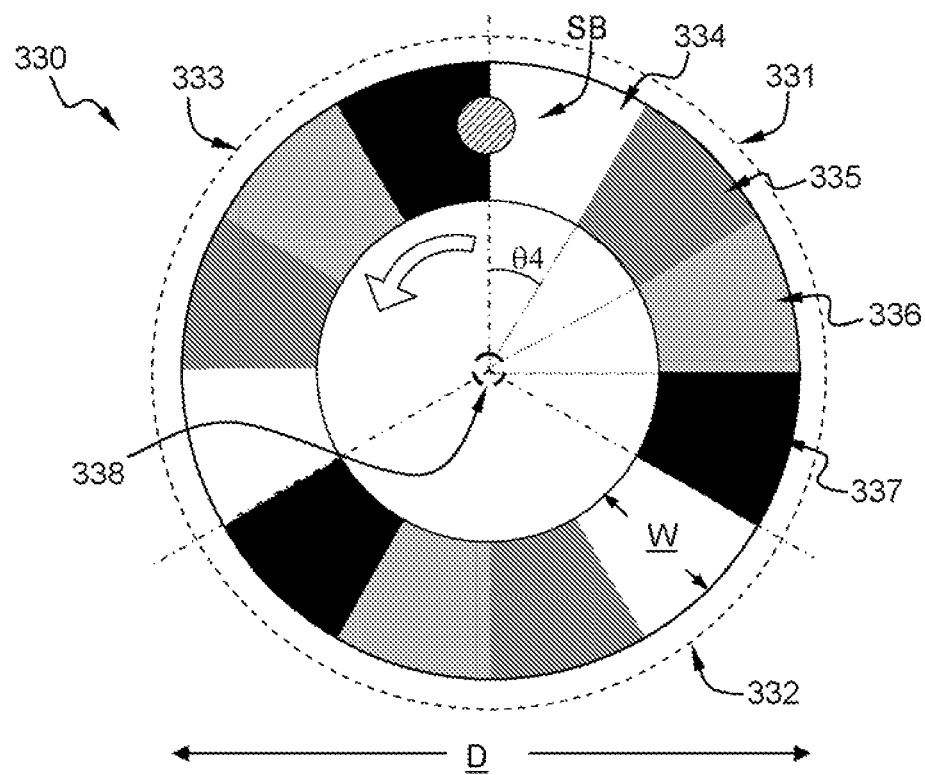
FIG. 7.A
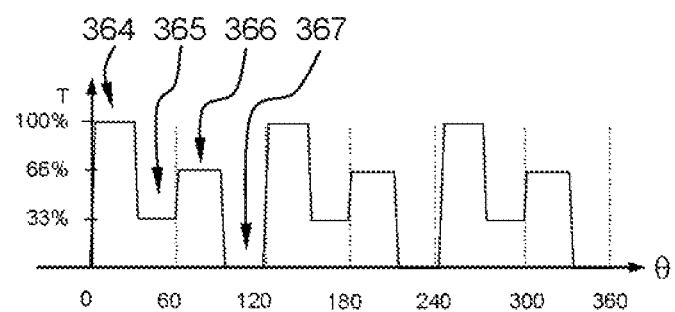
FIG. 7.B

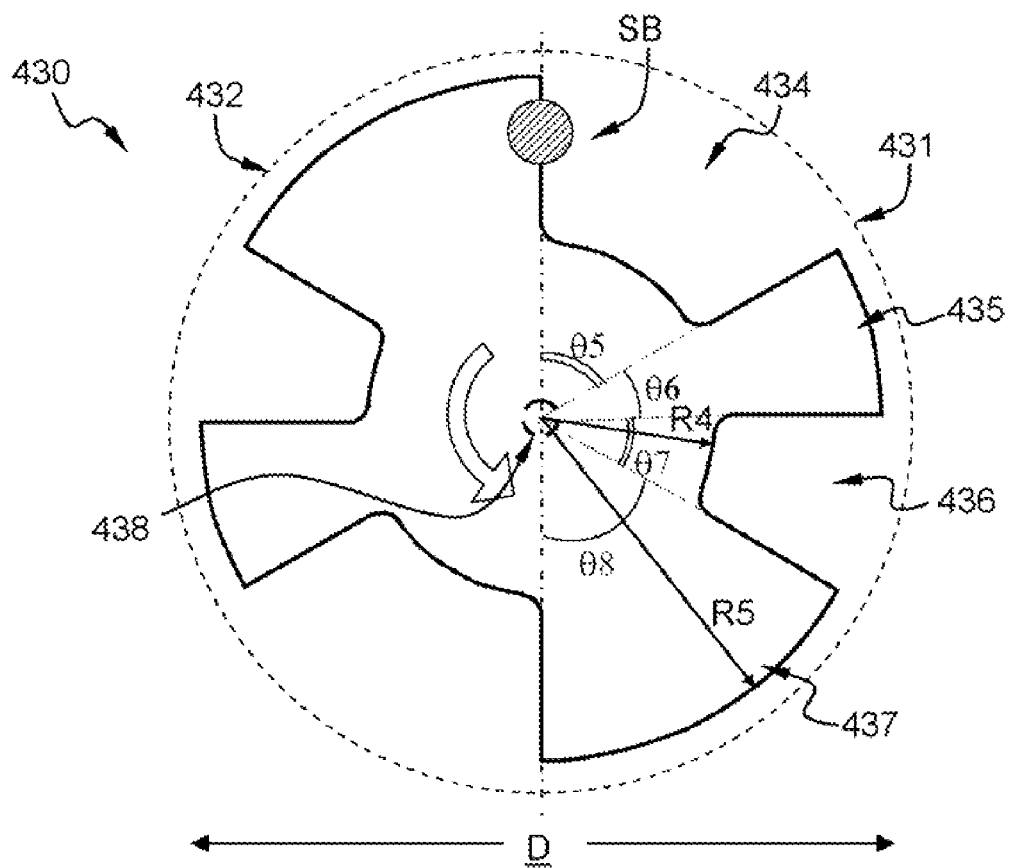
FIG. 8.A
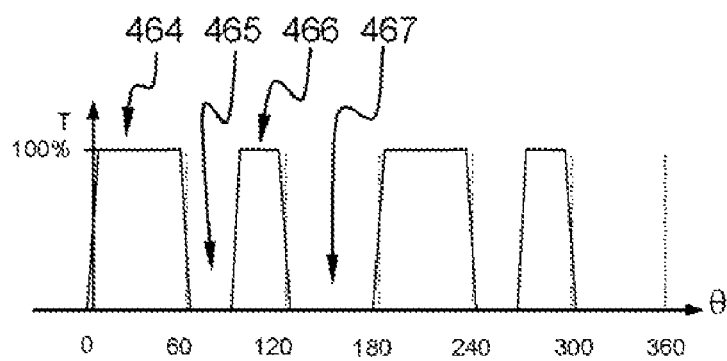
FIG. 8.B

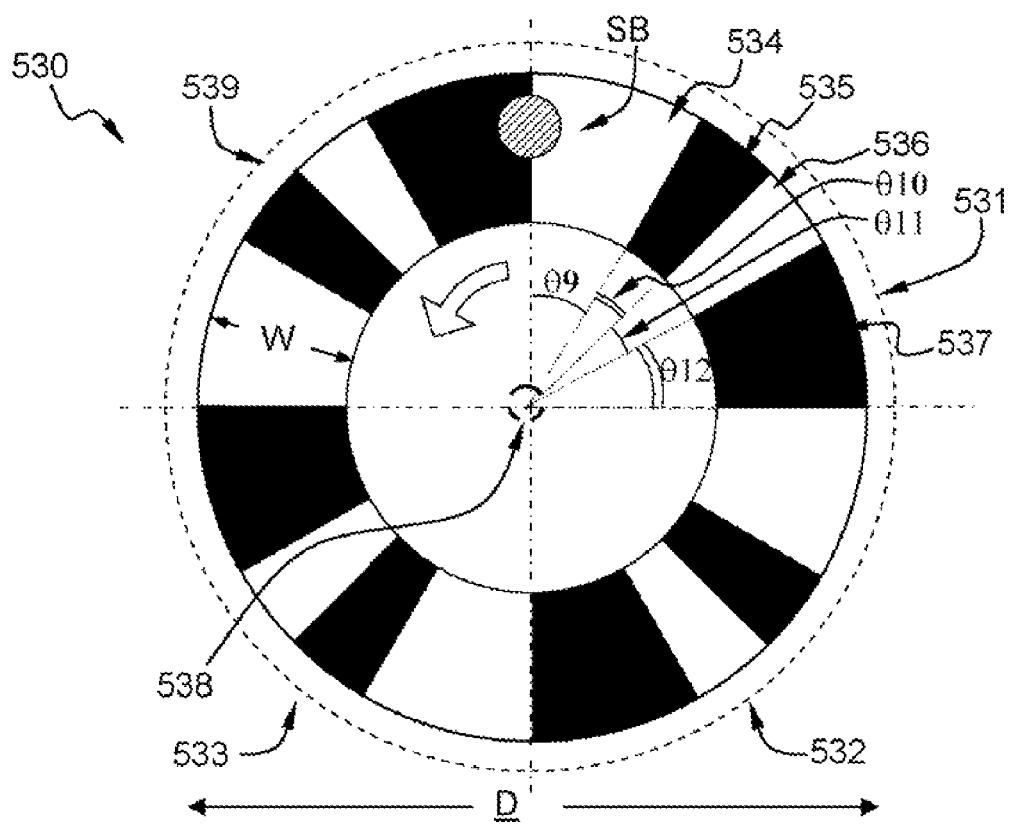
FIG. 9.A
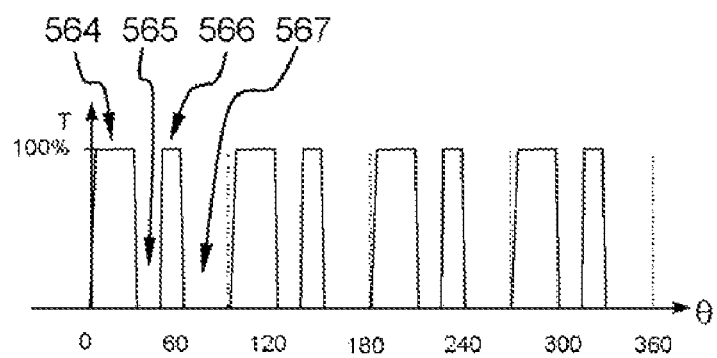
FIG. 9.B

DEVICE FOR MEASURING A FLUID FLOW VELOCITY AND DIRECTION

FIELD OF THE INVENTION

An aspect of the invention relates to a device for measuring a fluid flow velocity and direction.

Another aspect of the invention relates to a method for measuring a fluid flow velocity and direction.

A particular application of the invention pertains to fluid flow measurements in harsh environment, for example high pressure and high temperature environment that can be found in applications of the oilfield service industry.

BACKGROUND OF THE INVENTION

A device for measuring in situ the velocity of a fluid flow, thus the fluid flow rate of a fluid flowing in a well-bore is known in the art. The flow measurement can be based on the measurements of the speed of rotation of an impeller, or a spinner. The speed of rotation of the spinner can be related to the amount of fluid passing through the measuring device. There are several types of spinner: a helical spinner, a vane-like spinner, a full-bore spinner or various types of flow-concentrating or diverter spinners. While the spinner is the most common flow-meter, torque flow-meters and cross-correlation flow-meters can also be used.

For example, the patent JP 8165879 describes a bore-hole flow velocity measuring device. The measuring device measures the velocity of a high-pressure and high-temperature fluid flowing into the bore-hole. The measuring device comprises a propeller positioned within the flowing fluid. The fluid velocity is converted into the rotation of the propeller which is transmitted to a slit disk. The slit disk interrupts the light fed through an optical path. The optical path is constituted of a first optical fiber, a first lens, a glass window provided on a pressure container, a reflector, a second lens, and a second optical fiber. The slit disk converts the light into an intermittent modulating signal of light which is provided to a photo-detector. The intermittent modulating signal of light is converted into an electrical pulse signal. The fluid velocity is measured by counting the number of pulse signal per time unit.

This measuring device fails to give indication regarding the direction of the flowing fluid and is not accurate in particular situation, e.g. low speed flow regime, erratic flow regime, etc. . . .

SUMMARY OF THE INVENTION

It is an object of the invention to propose a device for measuring a fluid flow velocity and direction that overcomes at least one of the drawbacks of the prior art measuring device.

According to a first aspect, the invention relates to a device for measuring a fluid flow FF velocity and direction comprising:
 a pivotable means adapted to rotate at a pivotable means rotation velocity and direction depending on the fluid flow velocity and direction when in contact with the fluid flow,
 a modulator coupled to the pivotable means and adapted to rotate in conjunction with the pivotable means,
 an optical fiber arrangement for providing an incident beam to the modulator and for receiving a return beam from the modulator,
 the incident beam comprising an incident signal, the return beam comprising a modulated signal, the modulator modulating the incident signal so as to form the modulated signal depending on the pivotable means rotation velocity and direction.

The modulator comprises an encoder comprising at least a first angular sector, a second angular sector and a third angular sector, each angular sector having a determined attenuation coefficient so that the modulated signal comprises at least a first portion, a second portion and a third portion for each complete rotation of the encoder. The device further comprises a processing means for determining the fluid flow velocity and direction based on at least the first portion, the second portion and the third portion of the modulated signal.

The modulator may be magnetically or mechanically coupled to the pivotable means.

The encoder may be an amplitude encoder. The first angular sector, the second angular sector and the third angular sector have substantially the same angle. Each sector transmits a determined percentage of the incident beam that is different from the other sector.

Advantageously, the amplitude encoder has a disk shape, the first angular sector has a first radius, the second angular sector has a second radius and the third angular sector has a third radius, each sector being made of a material that substantially blocks the incident beam.

Optionally, the incident beam may be split into a first beam and a second beam. The second radius and the third radius are chosen so as to define a first track for the first beam. The first and the second angular sectors substantially transmits the first beam while the third angular sector substantially blocks the first beam. The first radius and the second radius are chosen so as to define a second track for the second beam. The first angular sector substantially transmits the second beam while the second and the third angular sectors substantially blocks the second beam.

Alternatively, the amplitude encoder may have a disk shape wherein the first angular sector is made of a first filtering element, the second angular sector is made of a second filtering element and the third angular sector is made of a third filtering element.

The encoder may be a time encoder. The first angular sector and the third angular sector is defined by an angle, and the second angular sector and the fourth angular sector is defined by another angle; said angles being different. The first and third angular sector substantially transmits the incident beam, and the second angular sector substantially blocks the incident beam.

As an alternative, the time encoder may be designed such that the first and the third angular sectors have a first radius, and the second and fourth angular sectors have a second radius, each angular sector being made of a material that substantially blocks the incident beam.

The first and third angular sectors are made of a first filtering element, and the second and fourth angular sectors are made of a second filtering element, the first filtering element transmitting a determined percentage of the incident beam that is different from the second filtering element.

The fiber optical arrangement may comprise:
 a laser source for generating the incident beam,
 a detector for converting the return beam into an electrical signal;
 a coupler for coupling the laser source and the detector to an end of a optical fiber,
 a beam shaper at another end of the optical fiber for providing the incident beam to the modulator and receiving the return beam from the modulator, and a mirror for reflecting the return beam to the beam shaper.

The mirror may be a concave mirror associated to a beam shaper formed by a truncated optical fiber.

The mirror may also be a corner cube mirror associated to a beam shaper under the form of a collimator.

The mirror may also be a plane mirror associated to a beam shaper under the form of a focuser.

Alternatively, the fiber optical arrangement may comprise:
a laser source for generating the incident beam,
a detector for converting the return beam into an electrical signal,
a first optical fiber coupling the laser source to the modulator for providing the incident beam to the modulator, and
a second optical fiber coupling the modulator to the detector for providing the return beam to the detector.

According to a further aspect, the invention relates to a measuring arrangement, wherein the measuring arrangement comprises a laser source providing an incident beam carrying a plurality of wavelengths, a multiplexer for separating and recombining the plurality of wavelengths, and a plurality of measuring device. Each measuring device is responsive to a specific wavelength and provides a return beam according to said specific wavelength. The measuring arrangement further comprises a de-multiplexer separating the return beam according to the specific wavelength into a plurality of dedicated detectors.

According to still a further aspect, the invention relates to a method for measuring a fluid flow velocity and direction. The method comprises the steps of:
providing an incident beam to a modulator rotating in conjunction with a pivotable means, the pivotable means rotating at a pivotable means rotation velocity and direction depending on the fluid flow velocity and direction when in contact with the fluid flow, the incident beam comprising an incident signal,
generating a return beam comprising a modulated signal by modulating the incident signal in dependence on the pivotable means rotation velocity and direction,
receiving the return beam from the modulator and processing the modulated signal,
wherein:
the step of modulating the incident signal comprises the step of encoding the modulated signal so that the modulated signal comprises a sequence of at least a first portion, a second portion and a third portion for each complete rotation of the encoder, and
the step of processing the modulated signal comprises the step of decoding the sequence for determining the fluid flow direction based on the at least first, second and third portions of the modulated signal.

The step of processing the modulated signal may further comprise the step of counting a plurality of said sequences per unit of time for determining the fluid flow velocity.

The step of processing the modulated signal may further comprise the step of determining the order of the portions into a sequence for determining the fluid flow direction.

The invention enables an all-optical interrogation of the measuring device. It avoids positioning the electronic circuits at close proximity of the measurements location where potential harsh environment can damaged the functionality of the electronic circuits.

Thus, the invention enables to achieve a high degree of compactness and reliability compared to prior art measuring device.

Further, the measuring device of the invention can be combined in a very efficient way with various optical measuring devices on the same fiber using multiplexing technique.

These and other aspects of the invention will be apparent from and elucidated with reference to the embodiments described hereinafter.

BRIEF DESCRIPTION OF THE DRAWINGS

The present invention is illustrated by way of example and not limited to the accompanying figures, in which like references indicate similar elements:

FIGS. 3.A, 3.B and 3.C show three types of beam shaper adapted to the first embodiment of the invention;

FIGS. 4.A and 4.B show a first amplitude encoder alternative and corresponding encoding signal according to the invention, respectively;

FIGS. 5.A and 5.B show a second amplitude encoder alternative and corresponding encoding signal according to the invention, respectively;

FIGS. 6.A and 6.B show a third amplitude encoder alternative and corresponding encoding signal according to the invention, respectively;

FIGS. 7.A and 7.B show a fourth amplitude encoder alternative and corresponding encoding signal according to the invention, respectively;

FIGS. 8.A and 8.B show a first time encoder alternative and corresponding encoding signal according to the invention, respectively;

FIGS. 9.A and 9.B show a second time encoder alternative and corresponding encoding signal according to the invention, respectively;

DETAILED DESCRIPTION OF THE INVENTION

Figure 1:
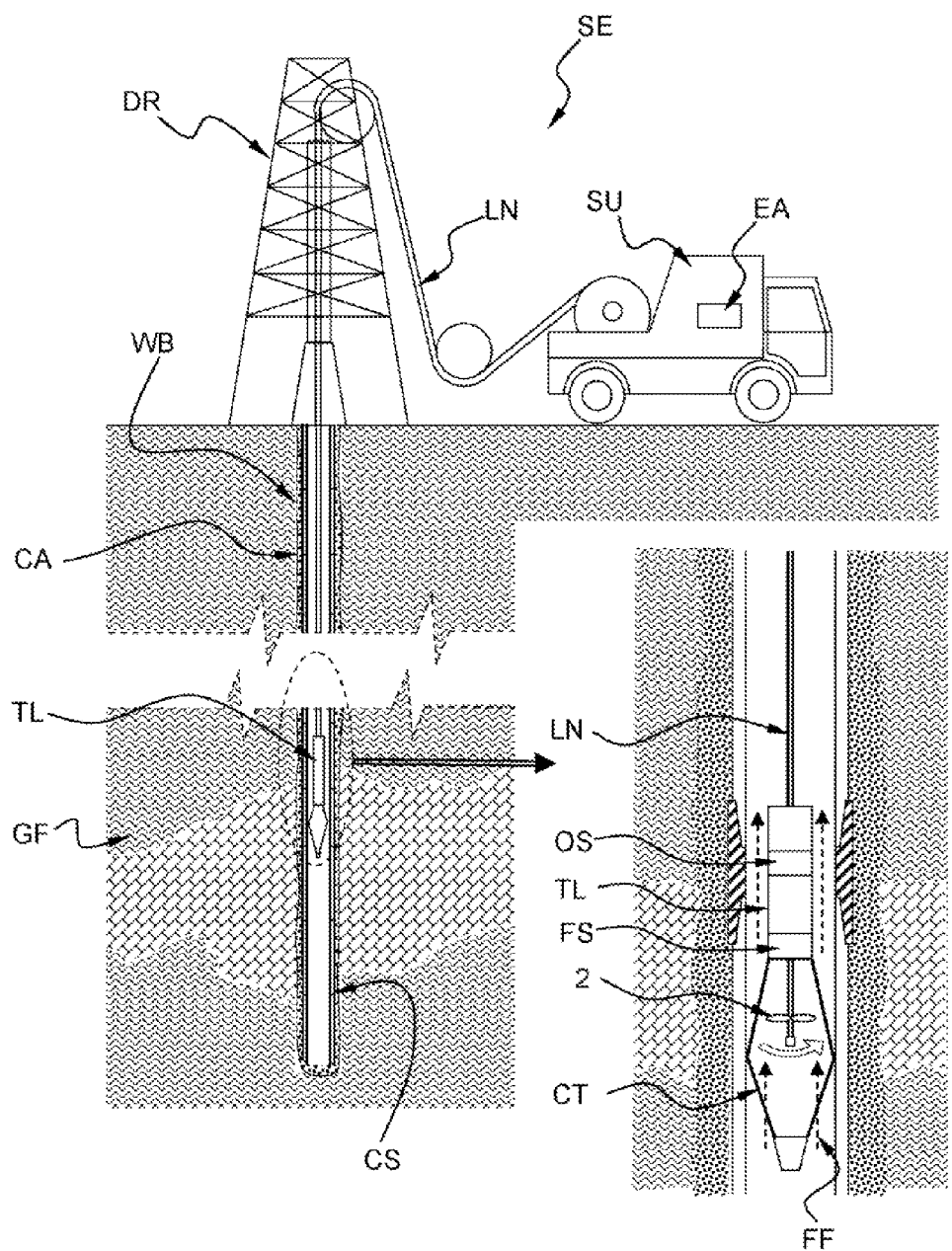
FIG. 1 schematically shows a typical onshore hydrocarbon well location.

FIG. 1 schematically shows a typical onshore hydrocarbon well location and surface equipments SE above a hydrocarbon geological formation GF after a well-bore WB drilling operation has been carried out, after a casing string CS has been run and after cementing operations have been carried out for sealing the annulus CA (i.e. the space between the well-bore WB and the casing string CS).

At this stage, well logging operation may be carried out. The well logging operation serves to measure various parameters of the hydrocarbon well geological formation (e.g. resistivity, porosity, etc. . . . at different depths) and in the well-bore (e.g. temperature, pressure, fluid type, fluid flowrate, etc. . . . at different depths). Such measurements are performed by a logging tool TL. Generally, a logging tool comprises at least one sensor (e.g. resistivity sonde, mechanical sonde, gamma ray neutron sonde, accelerometer, pressure sensor, temperature sensor, flow-meter, etc. . . . ) and measures at least one parameter. It may include a plurality of same or different sensors measuring one or more parameters. The logging tool is moved up and down in the borehole for gathering data about the various parameters by means of a cable LN.

According to the present invention, the cable is an optical cable comprising a fiber line protected against potential harsh environment existing in the well-bore. The optical cable transmits optical signals from the logging tool TL to the surface unit, e.g. a vehicle SU.

The logging tool may be deployed inside the well-bore by an adapted surface equipment SE that may include a vehicle SU and an adapted deploying system, e.g. a drilling rig DR or the like. Data related to the hydrocarbon geological formation GF or to the well-bore WB gathered by the logging tool IL may be transmitted in real-time to the surface, for example to the vehicle fitted with an appropriate electronic arrangement EA. The electronic arrangement may comprise a data collection and analysis computer and may be loaded with data collection and analysis software. FIG. 1 also schematically shows a magnified view of a portion of the cased well-bore, wherein the tool TL is positioned by means of a centralizer CT. The tool TL comprises a pivotable means, e.g., a spinner 2, coupled to a flow-meter sonde FS (this part of the device for measuring a fluid flow velocity and direction according to the invention will be described in more details hereinafter). The speed and direction of rotation of the spinner is related to the amount of fluid FF flowing at the tool level.

FIG. 1 shows a well-bore which is a production well, namely a well producing oil and gas flowing towards the surface (arrows directed upward). However, the well-bore could also be an injection well, namely a well into which fluid is injected from the surface towards the geological formation.

The tool TL may also comprise other sensors OS. The tool IL provides the measurements to the surface equipment through the connection line LN. By correlating this detection with depth measurements made by the tool IL it is possible to log flow measurements relatively to the depth.

Figure 2:
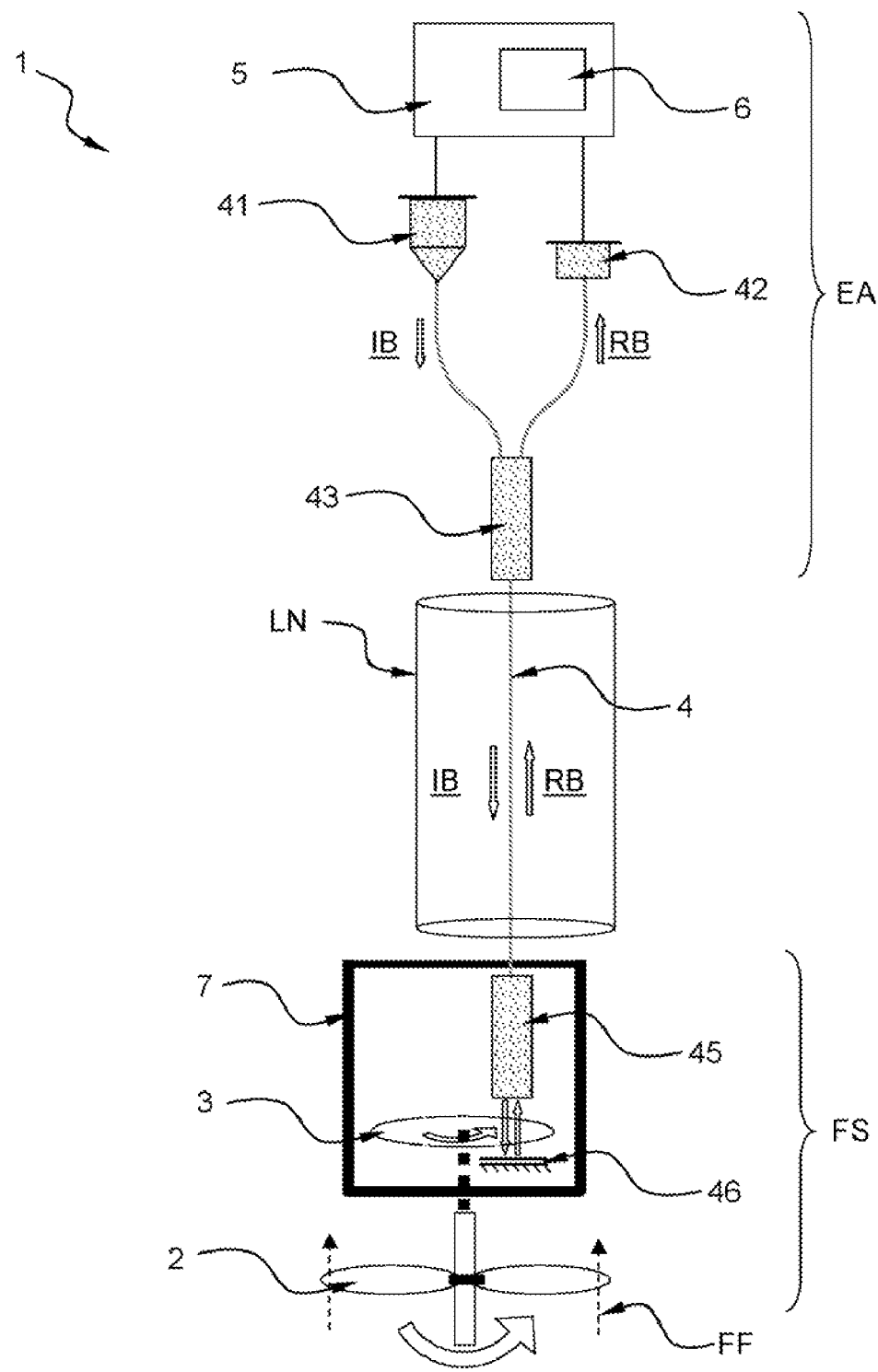
FIG. 2 schematically shows a device for measuring a fluid flow velocity and direction according to a first embodiment of the invention.

FIG. 2 schematically shows a device 1 for measuring a fluid flow velocity and direction according to a first embodiment of the invention.

The device 1 for measuring a fluid flow velocity and direction comprises a flow-meter sonde FS, an optical fiber 4 and an electronic arrangement EA.

The flow-meter sonde FS comprises a spinner 2, a modulator 3, a beam shaper 45 and a mirror 46. The modulator 3, the beam shaper 45 and the mirror 46 are packaged within a housing 7. The housing 7 ensures an appropriate protection against the harsh environment (high pressure, high temperature, vibration . . . ) that may exist within the well-bore and maintain alignment of the optical element within tolerance. The spinner 2 is positioned outside the housing in contact with the fluid flow FF. The spinner rotates at a spinner rotation velocity and direction depending on the axial component (shown by the arrows) of the fluid flow FF.

The modulator 3 is coupled to the spinner 2 and rotates in conjunction with the spinner. Preferably, the modulator 3 and the spinner 2 are magnetically coupled together. This configuration is a simple configuration enabling to maintain the optical elements of the flow-meter sonde FS in a clean environment.

As an alternative (not shown), the modulator and the spinner can be mechanically coupled together. The mechanical coupling can be made through, for example, a direct shaft link and an appropriate sealing between the shaft and the housing.

The optical fiber 4 connects the flow-meter sonde FS to the electronic arrangement EA. The optical fiber 4 is fitted within the cable LN. The cable LN may be armored. It protects the optical fiber from saltwater, hydrogen and chemical attack and provides mechanical tension strength for wire-line operation. The optical fiber may be either a single mode fiber or a multi mode fiber.

The electronic arrangement EA comprises a laser source 41, a detector 42, an optical coupler 43, and an electronic circuitry 5. The electronic arrangement EA is connected to the optical fiber 4 by means of the coupler 43. The optical side of the laser source 41 and of the detector 42 is connected to the coupler 43. The electronic side of the laser source 41 and of the detector 42 is connected to the electronic circuitry 5. The electronic circuitry 5 comprises a processing means 6. For example, the processing means can be a micro-processor and a memory arrangement loaded with appropriate software.

The laser source provides an incident beam IB under the form of a laser beam. The laser beam may consist of a monochromatic wavelength, for example 1310 nm or 1550 nm. The choice of the wavelengths depends on the deployed optical fiber length between the electronic arrangement and the flow-meter sonde (deport distance). If the deport length is around a few meters, a wavelength in the visible domain might be used. If the deport length is around a few kilometers, a wavelength in near infrared domain is preferred because of its low attenuation. Further, the choice of the laser source power depends on the deployed optical fiber length and optical components losses. For example, the power of the return beam at the detector should be around or higher than a few micro-Watts.

The detector 42 converts a return beam RB into an electrical signal which is provided to the electronic circuit 5. Advantageously, the detector 42 is a photodiode. Advantageously, the coupler is a 50/50 coupler that splits the return beam RB in two equal portions.

The beam shaper 45 and mirror 46 creates a free-space of a short distance (around a few millimeters). The modulator 3 is positioned within this free-space such that the beam can be modulated with information related to the spinner rotation. The beam shaper and mirror are designed to maintain low loss and alignment tolerance. Various beam shaper/mirror configurations are possible.

FIG. 3.A shows a first beam shaper/mirror configuration. The beam shaper is under the form of a truncated fiber 45A associated with a concave mirror 46A. Typically, the incident beam provided by the truncated fiber is a divergent beam having a determined numerical aperture NA (the angle of divergence with respect to the optical axis). In order to achieve a good alignment, the tip of the optical fiber is preferably positioned at the spherical center SCP of the mirror. This configuration has a tight tolerance in the position of the fiber tip but is insensitive to the rotation of the optical fiber around its tip.

FIG. 3.B shows a second beam shaper/mirror configuration. The beam shaper is under the form of a collimator 45B associated with a corner-cube mirror 46B. Typically, the incident beam provided by the collimator is a collimated beam having a numerical aperture that is smaller than the numerical aperture of a divergent beam. The corner cube mirror reflects the incident beam back to the direction of incidence regardless of angle of incidence. Thus, this configuration has good angular and longitudinal directions tolerances, and a tight lateral tolerance. In order to achieve a good alignment, the corner CCC of the cube should be at the center of the incident beam path. Otherwise, the return beam will be parallelly shifted.

FIG. 3.C shows a third beam shaper/mirror configuration. The beam shaper is under the form of a focuser 45C associated with a plane mirror 46C. Typically, the incident beam provided by the focuser is a focused beams having numerical aperture that is larger than the numerical aperture of a collimated beam. This configuration has good longitudinal and angular tolerances and is self-aligned in lateral direction. In order to achieve a good alignment, the mirror is positioned at the focal point FP and the mirror is perpendicular to the optical axis.

The preferred beam shaper/mirror configurations are the second and the third ones.

These configurations are stable under possible high temperature deformation and their alignment can be easily maintained.

However, when the device is used in a measuring arrangement comprising a plurality of multiplexed measuring devices, a spectral filter may be used in the path of the beam. In this case, the second beam shaper/mirror configuration is preferred.

The device 1 for measuring a fluid flow velocity and direction shown in FIG. 2 operates as follows.

The laser source 41 generates an incident beam IB consisting of an incident signal. The incident beam IB is provided to the modulator 3 via the coupler 43, the optical fiber 4 and the beam shaper 45. As a fluid flow FF pass through the device 1, the spinner 2 rotates according to a spinner rotation velocity and direction. Due to the coupling between the spinner 2 and the modulator 3, the modulator rotates in concert with the spinner. The modulator 3 modulates the incident signal so as to form a modulated signal depending on the spinner rotation velocity and direction. The mirror 46 reflects the return beam consisting of the modulated signal towards the detector 42 via the beam shaper 45, the optical fiber 4 and the coupler 43. The detector 42 converts the optical type modulated signal into an electrical type modulated signal that is provided to the electronic circuitry 5. The processing means 6 calculates the fluid flow velocity and direction based on the modulated signal.

The modulator may be an amplitude encoder or a time encoder. The various possible modulator alternatives and their respective operation will be explained hereinafter in more details.

FIG. 4.A shows a modulator under the form of an amplitude encoder 30 according to a first alternative.

The amplitude encoder 30 has a disk shape of diameter D. The disk shape has a particular pattern which is cut into a material that substantially blocks the laser beam.

For example, the particular pattern is cut into a metal plate. The encoder 30 comprises a hole 38 for coupling with a shaft (not shown). The encoder 30 comprises a first part 31 and a second part 32, each part consisting of a 180° angular sector. The first part 31 comprises a first angular sector 34, a second angular sector 35 and a third angular sector 36. The first angular sector 34 has a first radius R1 and is defined by an angle θ1. The second angular sector 35 has a second radius R2 and is defined by substantially the same angle θ1. The third angular sector 36 has a third radius R3 and is defined by substantially the same angle θ1.

In the example of FIG. 4.A, the angle θ1 is 60°. The single beam has a determined size (cross-section surface). Thus, the first radius R1 is chosen so that when a single beam SB hits the first angular sector, it substantially transmits said beam. The second radius R2 is chosen so that when a single beam SB hits the second angular sector, it substantially transmits half of said beam. The third radius R3 is chosen so that when a single beam SB hits the third angular sector, it substantially blocks said beam.

The second part 32 is substantially identical and will therefore not be further described.

As an example, the diameter D is 9 mm, the first radius R1 is 2 mm, the second radius R2 is 3.25 mm, the third radius R3 is 4.5 mm and the single beam diameter ranges from 0.8 mm to 2 mm.

FIG. 4.B represents the encoding signal obtained with the amplitude encoder of FIG. 4.A.

When the encoder 30 rotates according to the arrow (counterclockwise direction), the incident signal amplitude is modulated according to the following scheme. From 0° to 60°, the first angular sector substantially transmits the incident beam. The encoding signal comprises a first portion 64 corresponding to the transmission T of around 100% of the incident beam. From 60° to 120°, the second angular sector substantially transmits half of the incident beam. The encoding signal comprises a second portion 65 corresponding to the transmission T of around 50% of the incident beam. From 120° to 180°, the third angular sector substantially blocks the incident beam. The encoding signal comprises a third portion 66 corresponding to the transmission T of around 0% of the incident beam. The same scheme is repeated from 180° to 360° when the single beam SB hits the second part 32 of the encoder.

Consequently, in the present example, the modulated signal comprises a sequence of a first portion 64, a second portion 65 and a third portion 66 repeated two times for a complete rotation of the encoder.

FIG. 5.A shows a modulator under the form of an amplitude encoder according to a second alternative.

The amplitude encoder 130 has a disk shape of diameter D. The disk shape has a particular pattern which is cut into a material (e.g. metal plate) that substantially blocks the laser beam. The encoder 130 comprises a hole 138 for coupling with a shaft (not shown). The encoder 130 comprises a first part 131 and a second part 132, each part consisting of a 180° angular sector. The first part 131 comprises a first angular sector 134, a second angular sector 135 and a third angular sector 136. The first angular sector 134 has a first radius R1 and is defined by an angle θ2. The second angular sector 135 has a second radius R2 and is defined by substantially the same angle θ2. The third angular sector 136 has a third radius R3 and is defined substantially the same angle θ2.

In the example of FIG. 5.A, the angle θ2 is 60°. Further, the first radius R1, the second radius R2 and the third radius R3 are chosen so as to define a first track 139A and a second track 139B.

The second part 132 is substantially identical and will therefore not be further described.

According to the second alternative, the single beam is replaced by a dual beam. The dual beam comprises a first beam DB1 and a second beam DB2 of reduced size relatively to the single beam. The first beam DB1 and the second beam DB2 are generated by a splitting arrangement (not shown). The splitting arrangement comprises a splitter and two parallel collimators.

The first beam DB1 is positioned so as to hit the encoder on the first track 139A. The second beam DB2 is positioned so as to hit the encoder on the second track 139A. Thus, the first beam DB1 is substantially transmitted when the first beam hits the first and second angular sectors. The first beam DB1 is substantially blocked when the first beam hits the third angular sector. The second beam DB2 is substantially blocked when the second beam hits the second and third angular sectors. The second beam DB2 is substantially transmitted when the second beam hits the first angular sector. Both beams are recombined into a single return beam at the splitting arrangement.

As an example, the diameter D is 9 mm, the first radius R1 is 2 mm, the second radius R2 is 3.25 mm, the third radius R3 is 4.5 mm and each dual beam diameter ranges from 0.2 mm to 0.4 mm.

FIG. 5.B represents the encoding signal obtained with the amplitude encoder of FIG. 5.A.

When the encoder 130 rotates according to the arrow (counterclockwise direction), the incident signal amplitude is modulated according to the following scheme. From 0° to 60°, the first angular sector of the first part substantially transmits the first beam. The first angular sector of the second part substantially transmits the second beam. The encoding signal comprises a first portion 164 corresponding to the transmission T of around 100% of the incident beam. From 60° to 120°, the second angular sector of the first part substantially transmits the first beam. The second angular sector of the second part substantially blocks the second beam. The encoding signal comprises a second portion 165 corresponding to the transmission T of around 50% of the incident beam. From 120° to 180°, the third angular sector of the first and second part substantially blocks the first and the second beam, respectively. The encoding signal comprises a third portion 166 corresponding to the transmission T of around 0% of the incident dual beam. The same scheme is repeated from 180° to 360° when the first beam DB1 hits the second part 132 of the encoder, and the second beam DB2 hits the first part 131 of the encoder.

Consequently, in the present example, the modulated signal comprises a sequence of first portion 164, a second portion 165 and a third portion 166 repeated two times for a complete rotation of the encoder.

This alternative enables a sharper transition between the different portions than the first alternative.

FIG. 6.A shows a modulator under the form of an amplitude encoder according to a third alternative.

The amplitude encoder 230 has a disk shape of diameter D. The encoder 230 comprises a hole 238 for coupling with a shaft (not shown). The encoder 230 comprises a single part 231 consisting of a 360° angular sector. The single part 231 comprises a first angular sector 234, a second angular sector 235 and a third angular sector 236. Each angular sector is defined by an angle θ3 of 120°. The first angular sector is made of a first filtering element, the second angular sector is made of a second filtering element and the third angular sector is made of a third filtering element. The first filtering element substantially transmits 100% of the incident beam. The second filtering element substantially transmits 50% of the incident beam. The third filtering element substantially blocks the incident beam. In the present example, the filtering elements are positioned on a circumference of width W of the encoder. The width is chosen so that each filtering element defines a window size substantially greater than the single beam SB size when the beam hits the circumference.

As an example, the diameter D is 9 mm, the circumference W is 2 mm wide and the single beam diameter ranges from 0.8 mm to 2 mm. The encoder is made of a transparent material, e.g. a glass plate. The different filtering elements are made of metal coating of controlled thicknesses deposited onto the glass plate through a photolithography process. A further anti-reflective coating may be deposited on both sides of the encoder so as to reduce reflective loss.

FIG. 6.B represents the encoding signal obtained with the amplitude encoder of FIG. 6.A.

When the encoder 230 rotates according to the arrow (counterclockwise direction), the incident signal amplitude is modulated according to the following scheme. From 0° to 120°, the first angular sector substantially transmits the incident beam. The encoding signal comprises a first portion 264 corresponding to the transmission T of around 100% of the incident beam. From 120° to 240°, the second angular sector substantially transmits half of the incident beam. The encoding signal comprises a second portion 265 corresponding to the transmission T of around 50% of the incident beam. From 240° to 360°, the third angular sector substantially blocks the incident beam. The encoding signal comprises a third portion 266 corresponding to the transmission T of around 0% of the incident beam.

Consequently, in the present example, the modulated signal comprises a sequence of a first portion 264, a second portion 265 and a third portion 266 for a complete rotation of the encoder.

FIG. 7.A shows a modulator under the form of an amplitude encoder according to a fourth alternative.

The amplitude encoder 330 has a disk shape of diameter D. The encoder 330 comprises a hole 338 for coupling with a shaft (not shown). The encoder 330 comprises a first part 331, a second part 332 and a third part 333, each part consisting of a 120° angular sector. The first part 331 comprises a first angular sector 334, a second angular sector 335, a third angular sector 336 and fourth angular sector 337. Each angular sector is defined by an angle θ4 of 30°. The first, second, third and fourth angular sectors are made of a first, second, third and fourth filtering elements, respectively. The first filtering element substantially transmits 100% of the incident beam. The second filtering element substantially transmits 33% of the incident beam. The third filtering element substantially transmits 66% of the incident beam. The fourth filtering element substantially blocks the incident beam. In the present example, the filtering elements are positioned on a circumference of width W of the encoder. The width is chosen so that each filtering element defines a window size substantially greater than the single beam SB size when the beam hits the circumference.

The second part 332 and the third part 333 are substantially identical and will therefore not be further described.

As an example, the diameter D is 9 mm, the circumference W is 2 mm wide and the single beam diameter ranges from 0.4 mm to 0.8 mm. The encoder is made of a transparent material, e.g. a glass plate. The different filtering elements are made of metal coating of controlled thicknesses deposited onto the glass plate through a photolithography process. A further anti-reflective coating may be deposited on both sides of the encoder so as to reduce reflective loss.

FIG. 7.B represents the encoding signal obtained with the amplitude encoder of FIG. 7.A.

When the encoder 330 rotates according to the arrow (counterclockwise direction), the incident signal amplitude is modulated according to the following scheme. From 0° to 30°, the first angular sector substantially transmits the incident beam. The encoding signal comprises a first portion 364 corresponding to the transmission T of around 100% of the incident beam. From 30° to 60°, the second angular sector substantially transmits 33% of the incident beam. The encoding signal comprises a second portion 365 corresponding to the transmission T of around 33% of the incident beam. From 60° to 90°, the third angular sector substantially transmits 66% of the incident beam. The encoding signal comprises a third portion 366 corresponding to the transmission T of around 66% of the incident beam. From 90° to 120°, the fourth angular sector substantially blocks the incident beam. The encoding signal comprises a fourth portion 367 corresponding to the transmission T of around 0% of the incident beam.

Consequently, in the present example, the modulated signal comprises a sequence of a first portion 364, a second portion 365, a third portion 366 and a fourth portion 367 repeated three times for a complete rotation of the encoder.

FIG. 8.A shows a modulator under the form of a time encoder according to a first alternative.

The time encoder 430 has a disk shape of diameter D. The disk shape has a particular pattern which is cut into a material that substantially blocks the laser beam. For example, the particular pattern is cut into a metal plate. The encoder 430 comprises a hole 438 for coupling with a shaft (not shown). The encoder 430 comprises a first part 431 and a second part 432, each part consisting of a 180° angular sector. The first part 431 comprises a first angular sector 434, a second angular sector 435, a third angular sector 436 and a fourth angular sector 437. The first angular sector 434 has a first radius R4 and is defined by a first angle θ5. The second angular sector 435 has a second radius R5 and is defined by a second angle θ6. The third angular sector 436 has the first radius R4 and is defined by a third angle θ7. The fourth angular sector 437 has the second radius R5 and is defined by a fourth angle θ8.

In the example of FIG. 8.A, the first angle θ5 is 60°, the second angle θ6 is 30°, the third angle θ7 is 30°, and the fourth angle θ8 is 60°. Further, the first radius R4 is chosen so that when a single beam SB hits the first or third angular sector, it substantially transmits said beam. The second radius R5 is chosen so that when a single beam SB hits the second or fourth angular sector, it substantially blocks said beam.

The second part 332 is substantially identical and will therefore not be further described.

As an example, the diameter D is 9 mm, the first radius R4 is 2 mm, the second radius R5 is 4.5 mm and the single beam diameter ranges from 0.2 mm to 0.4 mm. FIG. 8.B represents the encoding signal obtained with the time encoder of FIG. 5.A. When the encoder 430 rotates according to the arrow (counterclockwise direction), the incident signal amplitude is modulated according to the following scheme. From 0° to 60°, the first angular sector substantially transmits the incident beam. The encoding signal comprises a first portion 464 corresponding to the transmission T of around 100% of the incident beam. From 60° to 90°, the second angular sector substantially blocks the incident beam. The encoding signal comprises a second portion 465 corresponding to the transmission T of around 0% of the incident beam. From 90° to 120°, the third angular sector substantially transmits the incident beam. The encoding signal comprises a third portion 466 corresponding to the transmission T of around 100% of the incident beam. From 120° to 180°, the fourth angular sector substantially blocks the incident beam. The encoding signal comprises a fourth portion 467 corresponding to the transmission T of around 0% of the incident beam. Consequently, in the present example, the modulated signal comprises a sequence of a first portion 464, a second portion 465, a third portion 466 and a fourth portion 467 repeated two times for a complete rotation of the encoder.

FIG. 9.A shows modulator under the form of time encoder according to a second alternative.

The time encoder 530 has a disk shape of diameter D. The encoder 530 comprises a hole 538 for coupling with a shaft (not shown). The encoder 530 comprises a first part 531, a second part 532, a third part 533 and a fourth part 539, each part consisting of a 90° angular sector. The first part 531 comprises a first angular sector 534, a second angular sector 535, a third angular sector 536 and a fourth angular sector 537'. The first, second, third and fourth angular sectors are defined by a first θ9, a second θ10, a third θ11 and a fourth θ12, respectively. The first, second, third and fourth angular sectors comprise a first, a second, a third and a fourth filtering elements, respectively. The various filtering elements are chosen such that the attenuation coefficients of two consecutive angular sectors are alternating. More precisely, the first and third filtering elements substantially transmit 100% of the incident beam (transparent filtering element). The second and fourth filtering elements substantially block the incident beam (opaque filtering element). In the present example, the filtering elements are positioned on a circumference of width W of the encoder. The width is chosen so that each filtering element defines a window size substantially greater than the single beam SB size when the beam hits the circumference.

The second part 532, the third part 533 and the fourth part 539 are substantially identical and will therefore not be further described.

As an example, the diameter D is 9 mm, the circumference W is 2 mm wide and the single beam diameter ranges from 0.3 mm to 0.6 mm. The first θ9, second θ10, third θ11 and fourth θ12 angular sectors angles are 30°, 15°, 15° and 30°, respectively. The encoder is made of a transparent material, e.g. a glass plate. The different filtering elements are made of metal coating of controlled thicknesses deposited onto the glass plate through a photolithography process. A further anti-reflective coating may be deposited on both sides of the encoder so as to reduce reflective loss. FIG. 9.B represents the encoding signal obtained with the time encoder of FIG. 9.A. When the encoder 530 rotates according to the arrow (counterclockwise direction), the incident signal amplitude is modulated according to the following scheme. From 0° to 30°, the first angular sector substantially transmits the incident beam. The encoding signal comprises a first portion 564 corresponding to the transmission T of around 100% of the incident beam. From 30° to 45°, the second angular sector substantially blocks the incident beam. The encoding signal comprises a second portion 565 corresponding to the transmission T of around 0% of the incident beam. From 45° to 60°, the third angular sector substantially transmits the incident beam. The encoding signal comprises a third portion 566 corresponding to the transmission T of around 100% of the incident beam. From 60° to 90°, the fourth angular sector substantially blocks the incident beam. The encoding signal comprises a fourth portion 567 corresponding to the transmission T of around 0% of the incident beam. Consequently, in the present example, the modulated signal comprises a sequence of a first portion 564, a second portion 565, a third portion 566 and a fourth portion 567 repeated four times for a complete rotation of the encoder.

The processing means can determine the fluid flow velocity and direction by analyzing the modulated signal. For a considered period of time, the decoding of a sequence comprising a plurality of successive portions enables to determine the number of complete rotation of the encoder. The fluid flow velocity is proportional to the number of complete rotation of the encoder per unit of time. Thus, the velocity is determined by counting the number of sequence per unit of time. The fluid flow direction is determined by the different signal portions order in a sequence. More precisely, in the examples described hereinbefore, the sequence of signal portions order draws a particular pattern (FIG. 4.B, 5.B, 6.B, 7.B, 8.B and 9B) corresponding to the encoder rotating in the counterclockwise direction. When the signal portions order is inversed, it draws a reverse pattern corresponding to the encoder rotating in the clockwise direction.

Figures 10, 11:
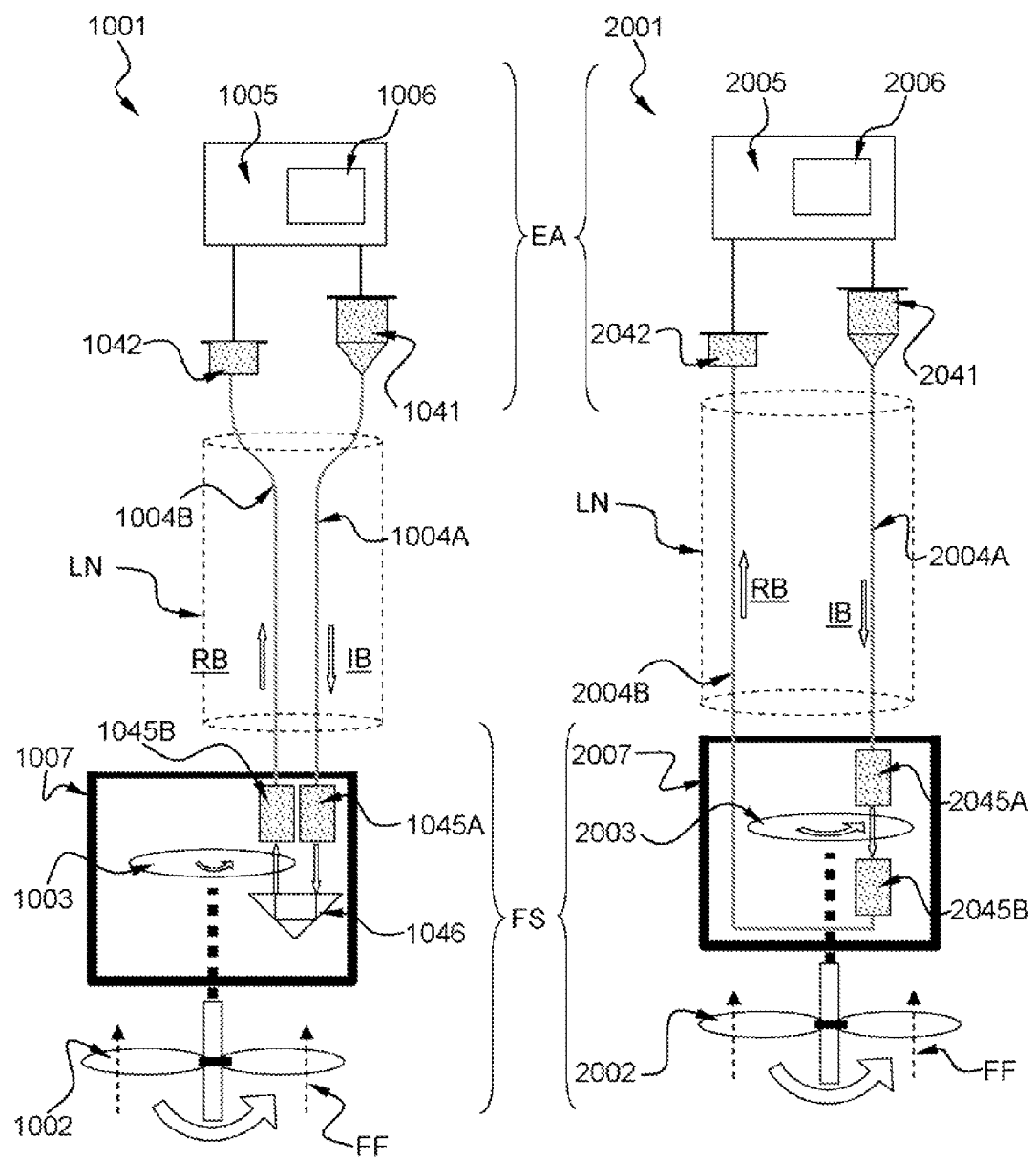
FIGS. 10 and 11 schematically show a device for measuring a fluid flow velocity and direction according to a second and third embodiment of the invention, respectively.

FIG. 10 schematically shows a device 1001 for measuring a fluid flow velocity and direction according to a second embodiment of the invention. The device according to the second embodiment of the invention differs from the first embodiment in that the coupler and the single optical fiber are replaced by a double optical fiber and a second beam shaper.

The device 1001 for measuring a fluid flow velocity and direction comprises a flow-meter sonde FS connected to an electronic arrangement EA through a first optical fiber 1004A and a second optical fiber 1004B.

The flow-meter sonde FS comprises a spinner 1002, a modulator 1003, a first beam shaper 1045A, a second beam shaper 1045B and a mirror 1046. The modulator 1003, the beam shapers 1045A, 1045B and the mirror 1046 are packaged within a housing 1007. The housing 1007 ensures an appropriate protection against the harsh environment (high pressure, high temperature, vibration . . . ) that may exist within the well-bore and maintain alignment of the optical element within tolerance. The spinner 1002 is positioned outside the housing in contact with the fluid flow FF. The spinner rotates at a spinner rotation velocity and direction depending on the axial component (shown by the arrows) of the fluid flow FF.

The modulator 1003 is coupled to the spinner 1002 and rotate in conjunction with the spinner. The modulator 1003 and the spinner 1002 may be magnetically or mechanically coupled together.

The first and second optical fibers 1004A, 1004B connect the flow-meter sonde FS to the electronic arrangement EA and are fitted within the cable LN.

The electronic arrangement EA comprises a laser source 1041, a detector 1042 and an electronic circuitry 1005. The electronic circuitry 1005 comprises a processing means 1006.

The laser source 1041 is coupled to the first beam shaper 1045A by the first optical fiber 1004A. The detector 1042 is coupled to the second beam shaper 1045B by the second optical fiber 1004B. The first 1045A and second 1045B beam shapers on the one side and the mirror 1046 on the other side define between them a free-space of a short distance (around a few millimeters). The modulator 1003 is positioned within this free-space such that either the incident beam IB or the return beam RB is modulated with information related to the spinner rotation. The first optical fiber 1004A and the first beam shaper 1045A provide the incident beam IB from the laser source to the modulator. The mirror reflects the first beam towards the second beam shaper 1045 B. The second optical fiber 1004B and the second beam shaper 1045B provide the return beam RB from the modulator to the detector.

Advantageously, the individual elements, except for the mirror, have the same characteristics as the ones described in relation with the first embodiment. Preferably, the mirror 1046 is a right-angle mirror comprising two orthogonal reflecting surfaces. When the incident beam IB hits the first reflecting surface, it is reflected towards the second reflecting surface. Then, the beam is reflected back to the second beam shaper 1045B. The incident beam and the return beam are separated apart by a few millimeters, allowing the space necessary for accommodating the two beam shapers. The operation principle of the modulator and the fluid flow velocity and direction determination is similar to the one already described hereinbefore with regards to the first embodiment.

FIG. 11 schematically shows a device 2001 for measuring a fluid flow velocity and direction according to a third embodiment of the invention. The device according to a third embodiment of the invention differs from the first embodiment in that the coupler, the mirror and the single optical fiber are replaced by a double optical fiber and a second beam shaper.

The device 2001 for measuring a fluid flow velocity and direction comprises a flow-meter sonde FS connected to an electronic arrangement EA through a first optical fiber 2004A and a second optical fiber 2004B.

The flow-meter sonde FS comprises a spinner 2002, a modulator 2003, a first beam shaper 2045A and a second beam shaper 2045B. The modulator 2003, the beam shapers 2045A, 2045B are packaged within a housing 2007. The housing 2007 ensures an appropriate protection against the harsh environment (high pressure, high temperature, vibration . . . ) that may exist within the well-bore and maintain alignment of the optical element within tolerance. The spinner 2002 is positioned outside the housing in contact with the fluid flow FF. The spinner rotates at a spinner rotation velocity and direction depending on the axial component (shown by the arrows) of the fluid flow FF.

The modulator 2003 is coupled to the spinner 2002 and rotates in conjunction with the spinner. The modulator 2003 and the spinner 2002 may be magnetically or mechanically coupled together.

The first and second optical fibers 2004A, 2004B connect the flow-meter sonde FS to the electronic arrangement EA and are fitted within the cable LN.

The electronic arrangement EA comprises a laser source 2041, a detector 2042 and an electronic circuitry 2005. The electronic circuitry 2005 comprises a processing means 2006.

The laser source 2041 is coupled to the first beam shaper 2045A by the first optical fiber 2004A. The detector 2042 is coupled to the second beam shaper 2045B by the second optical fiber 2004B. The first 2045A and second 2045B beam shapers define between them a free-space of a short distance (around a few millimeters). The modulator 2003 is positioned within this free-space such that the beam can be modulated with information related to the spinner rotation. The first optical fiber 2004A and the first beam shaper 2045A provide the incident beam IB from the laser source to the modulator. The second optical fiber 2004B and the second beam shaper 2045B provide the return beam RB from the modulator to the detector.

Advantageously, the individual elements have the same characteristics as the ones described in relation with the first embodiment. The operation principle of the modulator and the fluid flow velocity and direction determination is similar to the one already described hereinbefore with regards to the first embodiment.

Figure 12:
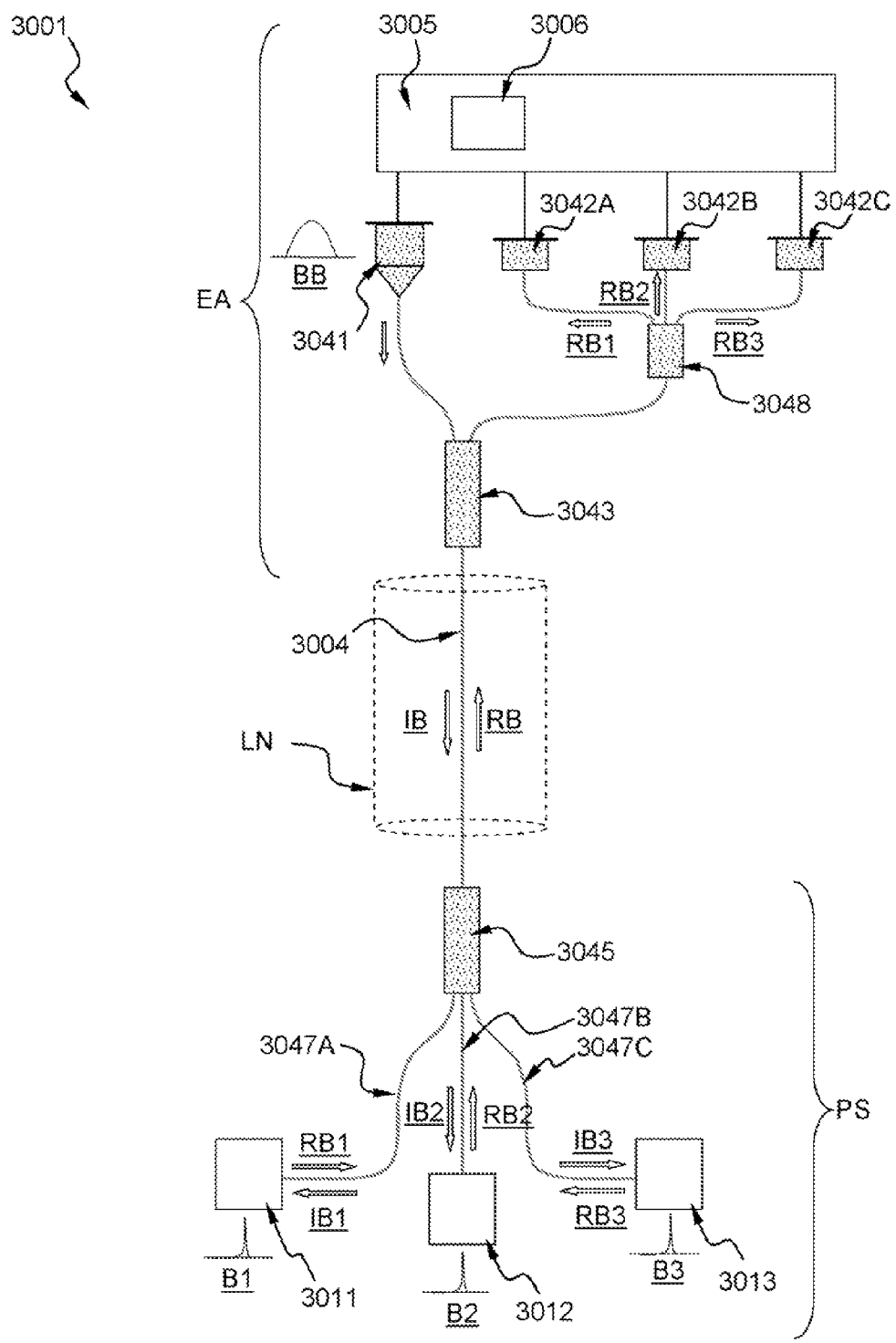
FIG. 12 schematically shows a measuring arrangement comprising a plurality of multiplexed measuring devices according to the invention.

FIG. 12 schematically shows a measuring arrangement 3001 comprising a plurality of multiplexed measuring devices according to a fourth embodiment of the invention. The measuring arrangement 3001 comprises a plurality of sondes PS, an optical fiber 3004 and an electronic arrangement EA.

The plurality of sondes PS comprises a multiplexer 3045 connected to a first measuring device 3011, a second measuring device 3012 and a third measuring device 3013 by a first optical fiber 3047A, a second optical fiber 3047B and a third optical fiber 3047C, respectively.

Each measuring device may be a spinner flowmeter as hereinbefore described or any other kind of sensor that may be optically interrogated.

The optical fiber 3004 connects the plurality of sondes PS to the electronic arrangement EA. The optical fiber 3004 is fitted within the cable LN. The electronic arrangement EA comprises a laser source 3041 three detectors 3042A, 3042B and 3042C, a 50/50 optical coupler 3043, a de-multiplexer 3048 and an electronic circuitry 3005. The electronic arrangement EA is connected to the optical fiber 3004 by means of the coupler 3043. The optical side of the laser source 3041 and an input port of the de-multiplexer 3048 are connected to the coupler 3043. The optical side of each detector is connected to each output port of the de-multiplexer 3048. The electronic side of the laser source 3041 and of the detectors 3042A, 3042B, 3042C is connected to the electronic circuitry 3005. The electronic circuitry 3005 comprises a processing means 3006.

Preferably, the laser source 3041 is a broadband source providing an incident beam IB carrying a plurality of wavelengths BB. The multiplexer 3045 provides a first incident beam IB1, a second incident beam IB2 and a third incident beam IB3 to the first measuring device 3011, the second measuring device 3012 and the third measuring device 3013, respectively. The first incident beam IB1, the second incident beam IB2 and the third incident beam IB3 carries a different wavelength, namely a first wavelength B1, a second wavelength B2 and a third wavelength B3, respectively. The first measuring device 3011, the second measuring device 3012 and the third measuring device 3013 provide a first return beam RB1, a second return beam RB2 and a third return beam RB3 to the multiplexer 3045, respectively. Each return beam comprises a modulated signal that contains the information about a measured quantity (e.g. fluid flow velocity and direction). The multiplexer 3045 provides the return beam RB carrying the plurality of modulated wavelengths to the de-multiplexer 3048 via the coupler 3043. The de-multiplexer 3048 separates the plurality of signals according to their wavelengths and sends each modulated signal RB1, RB2 and, RB3 to the dedicated detector 3042A, 3042B and 3042C, respectively. The electrical signal provided by the detectors is analyzed by the electronic circuitry 3005.

Alternatively, the multiplexer or the de-multiplexer, or both, may be replaced by a coupler, each measuring device and its corresponding detector further comprising a bandpass filter centered at a particular wavelength. Thus, each measuring device will encode the measured quantity according to a particular wavelength.

FINAL REMARKS

Various encoder alternatives have been hereinbefore described, each encoder alternative being characterized by a determined number of parts and of angular sectors, by the angle of each angular sector or by the radius of each angular sector. It will be apparent for a person skilled in the art that these are only examples. Others encoder alternatives showing variation in the number of parts, of angular sectors, angles and radius are also possible while being in the scope of the present invention. In particular, it will be apparent for a person skilled in the art that providing the encoder with more angular sectors or finer angular sectors will generate more complex pattern and sequence and increase the angular resolution of the encoder. Further, the percentages of transmission or attenuation coefficient that are mentioned in the various embodiments are only examples. It will be apparent for a person skilled in the art that other percentages of transmission or attenuation coefficient may be used provided that a sequence comprises portions that can be differentiated from each other by the processing means.

Though, a particular example pertaining to an onshore wireline logging was described in more details, the invention is also applicable to other type of situation (wireline while drilling, offshore location, etc. . . . ).

The drawings and their description hereinbefore illustrate rather than limit the invention.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A device for measuring a fluid flow (FF) velocity and direction comprising:
   a pivotable means adapted to rotate at a pivotable means rotation velocity and direction depending on the fluid flow velocity and direction when in contact with the fluid flow,
   a modulator coupled to the pivotable means and adapted to rotate in conjunction with the pivotable means,
   a fiber optical arrangement for providing an incident beam (IB) to the modulator and for receiving a return beam (RB) from the modulator,
   the incident beam (IB) comprising an incident signal, the return beam (RB) comprising a modulated signal, the modulator modulating the incident signal so as to form the modulated signal depending on the pivotable means rotation velocity and direction,
wherein,
   the modulator comprises an encoder comprising at least a first angular sector, a second angular sector and a third angular sector, each angular sector having a determined attenuation coefficient so that the modulated signal comprises at least a first portion, a second portion and a third portion for each complete rotation of the encoder,
   the device further comprises a processing means for determining the fluid flow (FF) velocity and direction based on at least the first portion, the second portion and the third portion of the modulated signal,
   the encoder is an amplitude encoder, the first angular sector, the second angular sector and the third angular sector having substantially the same angle ($\phi 1$, $\phi 2$, $\phi 3$), ROM, each sector transmitting a determined percentage of the incident beam that is different from the other sector.

2. The device according to claim 1, wherein the amplitude encoder has a disk shape, the first angular sector has a first radius (R1), the second angular sector has a second radius (R2) and the third angular sector has a third radius (R3), each sector being made of a material that substantially blocks the incident beam.

3. The device according to claim 1, wherein:
   the incident beam (IB) is split into a first beam (DB1) and a second beam (DB2),
   the second radius (R2) and the third radius (R3) are chosen so as to define a first track for the first beam (DB1), the first and the second angular sectors substantially transmitting the first beam, the third angular sector substantially blocking the first beam, and
   the first radius (R1) and the second radius (R2) are chosen so as to define a second track for the second beam (DB2), the first angular sector substantially transmitting the second beam, the second and the third angular sectors substantially blocking the second beam.

4. The device according to claim 1, wherein the amplitude encoder has a disk shape, the first angular sector is made of a first filtering element, the second angular sector is made of a second filtering element and the third angular sector is made of a third filtering element.

5. The device according to claim 1, wherein the fiber optical arrangement comprises:
   a laser source for generating the incident beam (IB),
   a detector for converting the return beam (RB) into an electrical signal,
   a coupler for coupling the laser source and the detector to an end of an optical fiber, a beam shaper at another end of the optical fiber for providing the incident beam (IB) to the modulator and receiving the return beam (RB) from the modulator, and a mirror for reflecting the return beam to the beam shaper.

6. The device according to claim 5, wherein the mirror is associated with the beam shaper which are formed by a concave mirror and a truncated optical fiber, or a corner cube mirror and a collimator, or a plane mirror and a focuser.

7. The device according to claim 1, wherein the fiber optical arrangement comprises:

a laser source for generating the incident beam (IB);

a detector for converting the return beam (RB) into an electrical signal, a first optical fiber coupling the laser source to the modulator for providing the incident beam to the modulator, and a second optical fiber coupling the modulator to the detector for providing the return beam (RB) to the detector.

8. The device according to claim 1, wherein the modulator is magnetically or mechanically coupled to the pivotable means.

9. A measuring arrangement, wherein the measuring arrangement comprises a laser source providing an incident beam (IB) carrying a plurality of wavelengths, a multiplexer for separating and recombining the plurality of wavelengths, a plurality of measuring devices according to claim 1, each measuring device being responsive to a specific wavelength (B1, B2, B3) and providing a return beam (RB1, RB2, RB3) according to said specific wavelength (B1, B2, B3), and a de-multiplexer separating the return beam according to the specific wavelength (B1, B2, B3) into a plurality of dedicated detectors.

10. A method for measuring a fluid flow velocity and direction comprising the steps of:

providing an incident beam to a modulator rotating in conjunction with a pivotable means, the modulator comprising a plurality of angular sectors, the pivotable means rotating at a pivotable means rotation velocity and direction depending on the fluid flow velocity and direction when in contact with the fluid flow, the incident beam comprising an incident signal, generating a return beam comprising a modulated signal by modulating the incident signal in dependence on the pivotable means rotation velocity and direction, receiving the return beam from the modulator and processing the modulated signal, the step of modulating the incident signal comprises the step of encoding the modulated signal so that the modulated signal comprises a sequence of at least a first portion, a second portion and a third portion for each complete rotation of the encoder, and the step of processing the modulated signal comprises the step of decoding the sequence for determining the fluid flow direction based on the at least first, second and third portions of the modulated signal, wherein at least the first portion, the second portion and the third portion have different amplitude and cover an identical angular sector.

11. The method according to claim 10, wherein the step of processing the modulated signal further comprises the step of counting a plurality of said sequences per unit of time for determining the fluid flow velocity.

12. The method according to claim 10, wherein the step of processing the modulated signal further comprises the step of determining the order of the portions into a sequence for determining the fluid flow direction.

* * * * *